(12) United States Patent
Kokkinen

(10) Patent No.: US 12,119,920 B2
(45) Date of Patent: Oct. 15, 2024

(54) METHOD AND SYSTEM FOR CONTROLLING SATELLITE COMMUNICATION

(71) Applicant: Fairspectrum Oy

(72) Inventor: Heikki Kokkinen, Helsinki (FI)

(73) Assignee: Fairspectrum Oy

( * ) Notice: Subject to any disclaimer, the term of this patent is extended or adjusted under 35 U.S.C. 154(b) by 117 days.

(21) Appl. No.: 18/171,408

(22) Filed: Feb. 20, 2023

(65) Prior Publication Data

US 2024/0283527 A1 Aug. 22, 2024

(51) Int. Cl.
H04B 7/185 (2006.01)
(52) U.S. Cl.
CPC ................. H04B 7/18513 (2013.01)
(58) Field of Classification Search
CPC ............................... H04B 7/185–195
See application file for complete search history.

(56) References Cited

U.S. PATENT DOCUMENTS

| | | | | |
|---|---|---|---|---|
| 5,785,279 A * | 7/1998 | Gregory | ............... | B64G 1/1021 244/158.4 |
| 11,095,361 B2 * | 8/2021 | Eichen | ............... | H04B 7/18513 |
| 2016/0149599 A1 | 5/2016 | Lindsay et al. | | |
| 2018/0343055 A1 | 11/2018 | Olson | | |
| 2019/0372207 A1 * | 12/2019 | Hardman | ............... | H01Q 1/08 |
| 2020/0250650 A1 * | 8/2020 | Gupta | ............... | G06Q 30/01 |
| 2021/0247519 A1 * | 8/2021 | Reid | ............... | G01S 19/072 |
| 2023/0189008 A1 * | 6/2023 | Martch | ............... | H04B 7/18519 370/320 |
| 2024/0172261 A1 * | 5/2024 | Alasti | ............... | H04W 72/0453 |

FOREIGN PATENT DOCUMENTS

WO 9631016 A1 10/1996

OTHER PUBLICATIONS

Finnish Patent and Registration Office, International Search Report, International Application No. PCT/FI2024/050011, Mailed Apr. 29, 2024, 13 Pages.

* cited by examiner

Primary Examiner — Raymond S Dean
(74) Attorney, Agent, or Firm — Ziegler IP Law Group LLC.

(57) ABSTRACT

Disclosed is method for controlling satellite communication of satellite (202) flying on trajectory over the earth (206). The method comprises providing first target location on surface of the earth; determining trajectory of satellite over the earth; identifying first interference restrictive area (214), which satellite trajectory passes; determining elevation angle ($\delta_1$, $\delta_2$) in respect to satellite and first target location, wherein elevation angle is angle between horizontal plane of the earth and vector pointing from first target location to satellite along trajectory at given moment of time; and activating first communication beam (208) from satellite towards first target location when elevation angle is between activation angle ($\delta_1$) and deactivation angle ($\delta_2$). Activation angle is less than deactivation angle if first interference restrictive area is located in forward direction in respect to satellite motion along trajectory, and activation angle is more than deactivation angle if first interference restrictive area is located in backward direction in respect to satellite motion along trajectory.

20 Claims, 9 Drawing Sheets

METHOD AND SYSTEM FOR CONTROLLING SATELLITE COMMUNICATION

TECHNICAL FIELD

The present disclosure relates to methods for controlling satellite communications of satellites flying on trajectories over the earth. The present disclosure also relates to systems for controlling satellite communications of satellites flying on trajectories over the earth. The present disclosure further relates to computer program products for controlling a satellite communication of a satellite flying on a trajectory over the earth.

BACKGROUND

A satellite communication connects one point on the Earth's surface to another point for the transfer of information (such as communication (e.g., 3GPP mobile communications, television and radio broadcasting, satellite phones, satellite internet, telemedicine, remote education), navigation (e.g., global positioning systems (GPS)), and weather monitoring (e.g., Public Protection and Disaster Recovery)) via a satellite that is positioned in space. Typically, the satellites orbit the Earth at different altitudes and velocities, for example, in geostationary orbits (satellites in such orbits remain in a fixed position relative to the Earth's surface) or in low Earth orbit (satellites in such orbits are closer to the Earth's surface). The satellite acts as a relay station, receiving signals from a ground-based transmitter and forwarding them to a ground-based receiver. This allows for communication over long distances, including across oceans and remote regions, where terrestrial communication systems are unavailable or limited. In recent past, satellite access to fifth (5G) and sixth (6G) generations of wireless communication technology aims to provide seamless and global connectivity to the internet even in remote and inhospitable environments (such as oceans, deserts, and mountain ranges) by extending the coverage of terrestrial networks, which are typically limited to populated areas, to bridge the digital divide and support the development of new technologies and applications. However, it is important to note that the implementation of satellite access to 5G and 6G services is still in its early stages, and there are technical, economic, and regulatory challenges that must be overcome.

Notably, 5G and 6G technologies require high bandwidth and low latency to support advanced applications such as mobile broadband, virtual reality and the Internet of Things (IOT). In this regard, an optimal spectrum band (a specific range of frequencies on the electromagnetic spectrum) has been dedicated for 5G or 6G satellite communication, by coordination between regulatory authorities and satellite and terrestrial telecommunications industries across the globe. It will be appreciated that a dedicated spectrum band ensures that satellite signals are not disrupted or interfered with by other sources of radio frequency (RF) signals, thereby, allowing an efficient, high-speed and reliable delivery of wireless services to users around the world. Moreover, the dedicated band must ensure no harmful interference is caused to other radio spectrum users. The International Telecommunication Union Radiocommunication Sector (ITU-R) radio regulations defines the harmful interference as interference which endangers the functioning of a radio-navigation service or of other safety services or seriously degrades, obstructs, or repeatedly interrupts a radiocommunication service operating in accordance with Radio Regulations. It will be appreciated that the radiocommunications can be shared by terrestrial systems and satellite systems as (1) terrestrial communication system is a primary user of the spectrum and satellite communication system is the secondary user of the spectrum, (2) coordinated spectrum sharing between co-primary users (i.e., extension of terrestrial network using satellite network; or sharing at least part of the same spectrum by multiple satellites). In this regard, interference management techniques control the use of radio spectrum resources such that spectrum users (namely, satellites, terrestrial basestations, UEs, and so on) do not cause harmful interference to each other. Interference management can also optimize the efficient use of radio spectrum resources or maintain a fair allocation (manual or automated) between parts of the spectrum. However, the conventional interference management techniques for controlling the spectrum sharing are not efficient as they tend to have too high protection (geographic, frequency, time or power level) margins around protected (restricted) areas.

Therefore, in light of the foregoing discussion, there exists a need to overcome the aforementioned drawbacks associated with existing techniques and equipment for controlling satellite communications.

SUMMARY

The present disclosure seeks to provide a method for controlling a satellite communication of a satellite flying on a trajectory over the earth. The present disclosure also seeks to provide a system for controlling a satellite communication of a satellite flying on a trajectory over the earth. The present disclosure further seeks to provide a computer program product for controlling a satellite communication of a satellite flying on a trajectory over the earth. An aim of the present disclosure is to provide a solution that overcomes at least partially the problems encountered in prior art.

In a first aspect, an embodiment of the present disclosure provides a method for controlling a satellite communication of a satellite flying on a trajectory over the earth, the method comprising
    providing a first target location on the surface of the earth;
    determining the trajectory of the satellite over the earth;
    identifying a first interference restrictive area, which the satellite trajectory passes;
    determining an elevation angle in respect to the satellite and the first target location, wherein the elevation angle is an angle between a horizontal plane of the earth and a vector pointing from the first target location to the satellite along the trajectory at given moment of time; and
    activating a first communication beam from the satellite towards the first target location when the elevation angle is between a activation angle and a deactivation angle, wherein
        the activation angle is less than the deactivation angle if the first interference restrictive area is located in a forward direction in respect to the satellite motion along the trajectory, and
        the deactivation angle is less than the activation angle if the first interference restrictive area is located in backward direction in respect to the satellite motion along the trajectory and;
    deactivating the first communication beam when the elevation angle is beyond the deactivation angle.

In a second aspect, an embodiment of the present disclosure provides a system for controlling satellite communication flying on a trajectory over the earth, the system comprising a server system configured to locate a first target location on the surface of the earth;

determine the trajectory of the satellite over the earth;

identify, from a database of restrictive areas, a first interference restrictive area which the satellite trajectory passes;

determine an elevation angle in respect to the satellite and the first target location, wherein the elevation angle is an angle between a horizontal plane of the earth and a vector pointing from the first target location to the satellite along the trajectory at given moment of time; and activate the first communication beam from the satellite towards the first target location when the elevation angle is between a activation angle and a deactivation angle, wherein the activation angle is less than the deactivation angle if the first interference restrictive area is located in a forward direction in respect to the satellite motion along the trajectory, and the deactivation angle is less than the activation angle if the first interference restrictive area is located in backward direction in respect to the satellite motion along the trajectory; and communicate values of the activation angle and the deactivation angle to the satellite.

In a third aspect, an embodiment of the present disclosure provides a computer program product comprising a non-transitory machine-readable data storage medium having stored thereon program instructions that, when executed by a processor, cause the processor to execute steps of a computer-implemented method of the first aspect. Embodiments of the present disclosure substantially eliminate or at least partially address the aforementioned problems in the prior art, and facilitate, in addition to efficient radiocommunication, efficient interference restriction by defining radio interference restrictive (namely, protected) areas and directing the radiocommunications to earth fixed beam transmissions arranged outside the radio interference restrictive areas or deactivating satellite beams. This enables accurate and robust bypassing of the radio interference restrictive areas by the orbiting satellites.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

Figure 1:
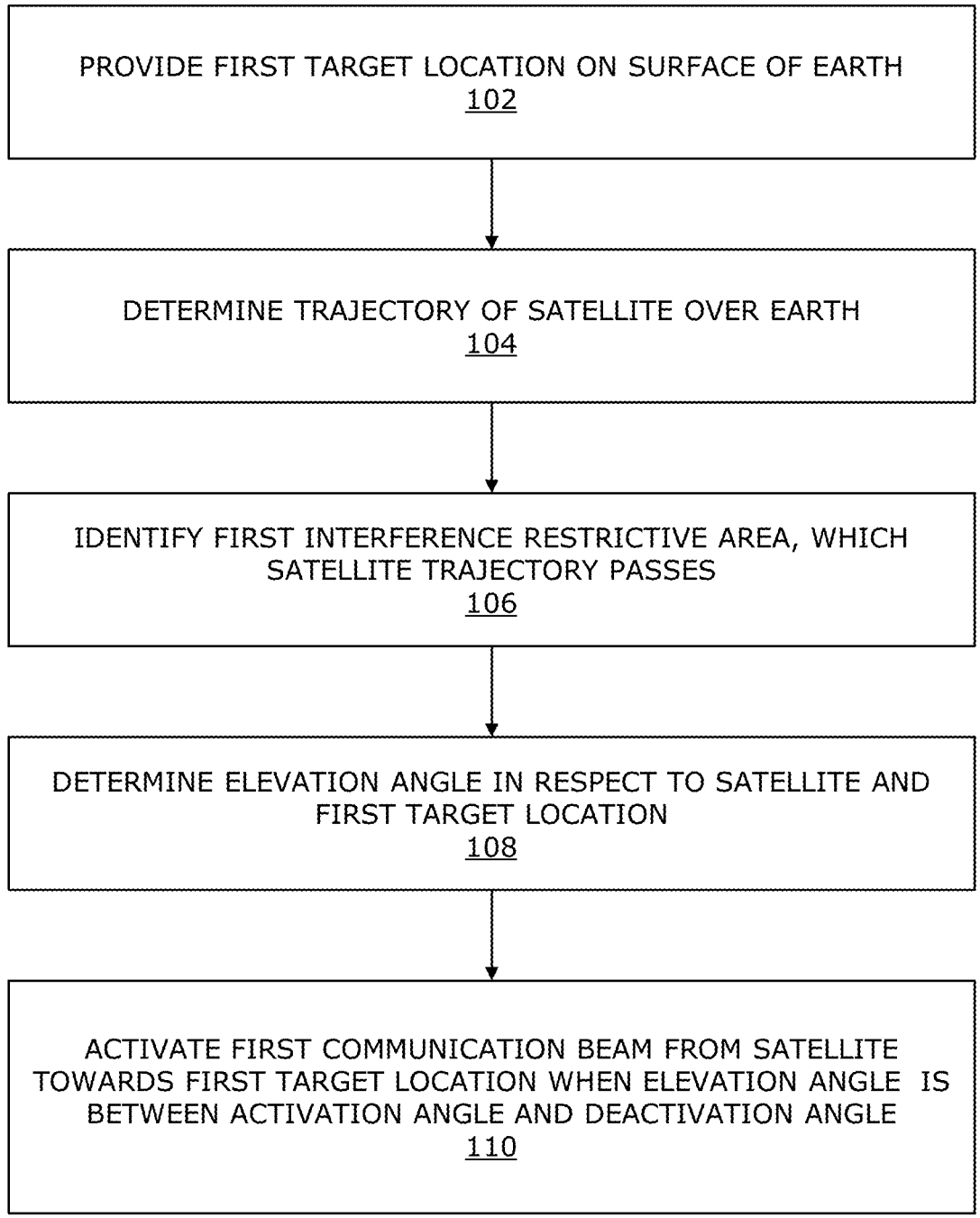
FIG. 1 illustrates steps of a method for controlling a satellite communication of a satellite flying on a trajectory over the earth, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a method for controlling a satellite communication of a satellite flying on a trajectory over the earth, the method comprising providing a first target location on the surface of the earth;

determining the trajectory of the satellite over the earth;

identifying a first interference restrictive area, which the satellite trajectory passes;

determining an elevation angle in respect to the satellite and the first target location, wherein the elevation angle is an angle between a horizontal plane of the earth and a vector pointing from the first target location to the satellite along the trajectory at given moment of time; and activating a first communication beam from the satellite towards the first target location when the elevation angle is between a activation angle and a deactivation angle, wherein the activation angle is less than the deactivation angle if the first interference restrictive area is located in a forward direction in respect to the satellite motion along the trajectory, and the deactivation angle is less than the activation angle if the first interference restrictive area is located in backward direction in respect to the satellite motion along the trajectory and;

deactivating the first communication beam when the elevation angle is beyond the deactivation angle. (i.e elevation angle value)

In a second aspect, an embodiment of the present disclosure provides a system for controlling satellite communication flying on a trajectory over the earth, the system comprising a server system configured to locate a first target location on the surface of the earth;
determine the trajectory of the satellite over the earth;
identify, from a database of restrictive areas, a first interference restrictive area which the satellite trajectory passes;
determine an elevation angle ($\delta1$, $\delta2$) in respect to the satellite and the first target location, wherein the elevation angle is an angle between a horizontal plane of the earth and a vector pointing from the first target location to the satellite along the trajectory at given moment of time; and
activate the first communication beam from the satellite towards the first target location when the elevation angle ($\delta1$, $\delta2$) is between a activation angle ($\delta1$) and a deactivation angle ($\delta2$), wherein
the activation angle is less than the deactivation angle if the first interference restrictive area is located in a forward direction in respect to the satellite motion along the trajectory, and
the deactivation angle is less than the activation angle if the first interference restrictive area is located in backward direction in respect to the satellite motion along the trajectory; and
communicate values of the activation angle and the deactivation angle to the satellite.

In a third aspect, an embodiment of the present disclosure provides a computer program product comprising a non-transitory machine-readable data storage medium having stored thereon program instructions that, when executed by a processor, cause the processor to execute steps of a computer-implemented method of the first aspect. The present disclosure provides the aforementioned method, the aforementioned system, and the aforementioned computer program product for facilitating improved radiocommunications of satellites orbiting around the earth while restricting harmful interference to other primary or secondary systems (namely, terrestrial basestations, user equipment (UEs), satellites, and so on) that share spectrum band dedicated for said radiocommunication. The method enables defining interference restrictive areas where the interference from the non-terrestrial network (NTN) radio transmissions is lower than a normal operation area of NTN. Moreover, the method uses such defined interference restrictive areas to control the satellite communication beams so that the coverage in front of the interference restrictive areas is primarily created with satellites, which are coming towards the interference restrictive area and the coverage after the interference restrictive areas is primarily created with satellites which are after the interference restrictive area.

The method for controlling a satellite communication of a satellite flying on a trajectory over the earth. The satellite is an artificial object placed in an orbit around the earth by following a specific path or route, referred to as "trajectory" thereof, for observing the earth from space. Optionally, the trajectory of the satellite defines the satellite's speed, altitude, and direction of motion. Herein, the phrase "controlling a satellite communication of a satellite" refers to managing and regulating the communication mechanism of the satellite to ensure that it functions effectively in space and relays information to and back from the earth-based station (namely, base station or a moving vehicle), while orbiting around the earth. Optionally, controlling the satellite communication may include, but is not limited to, monitoring the satellite's trajectory and position, adjusting its orientation and power usage, and transmitting and receiving information to and from the satellite. More optionally, controlling the satellite communication may include adjusting an antenna of the satellite or the antenna pattern of the antenna for a suitable communication thereby with the base station.

Notably, the antenna of the satellite is a crucial component of a satellite communication system, used to transmit and receive radio waves or other electromagnetic signals to and from the ground (namely, Earth-based stations or base stations) or other satellites. It will be appreciated that the number, size and shape of the antenna may vary depending on the type of satellite and the frequency of the signals it is designed to handle. Some satellites may have multiple antennas that are used for different purposes, such as for transmitting and receiving signals at different frequencies or for communicating with ground-based stations.

Optionally, the antenna of the satellite maintains one or more earth fixed beams. Typically, the earth fixed beam refers to a type of satellite communication antenna that is fixed to point towards a specific location on the Earth's surface when the satellite passes the location. The earth fixed beam type of antenna is designed to keep the beam in a fixed position relative to a location on the Earth, allowing it to maintain a constant connection with a particular location on the ground, such as a receiving station or a moving vehicle. Additionally, the satellite antenna may constantly need to adjust its direction to maintain a signal as the satellite and/or the earth moves, and the satellite antenna may constantly need to adjust the antenna radio pattern. Alternatively, the antenna of the satellite may be pointed towards the center of the earth and such the antenna pattern of the satellite constantly moves as the position of the satellite changes.

In this regard, the method comprises providing a first target location on the surface of the earth. Herein, the first target location is a specific point on the earth-based ground station, namely, a geographical area on ground or a base station or a moving vehicle at the geographical area, that is configured to send and receive information/signal to and from the antenna of the satellite. In this regard, the first target location is arranged on the surface of the earth such that it directly receives the satellite communication by maintaining a constant connection with the antenna of the satellite. It will be appreciated that the first target location also comprises an antenna that typically connects (receives and transmits) with the antenna of the satellite using a radio frequency (RF) link. In an embodiment, the antenna of the satellite is an earth fixed beam type of antenna, and therefore the first target location is an earth fixed beam receiver that receives satellite communication from the earth fixed beam type of antenna. The radio transmissions from the earth fixed beam type of antenna are transmissions or referred to earth fixed beam transmissions. In the earth fixed beam transmissions, the satellite tries to maintain the center of the beam in the first target location on the earth during its visibility to that first target location.

Moreover, the method comprises determining the trajectory of the satellite over the earth. Typically, the satellite's location and trajectory can be determined for example by using a network of tracking stations that monitor the satellite's orbit around the Earth. This information (orbital parameters) can be used to calculate position, speed, heading i.e. the trajectory of the satellite over earth. This trajectory information indeed includes factors such as the satellite's altitude, speed, and the gravitational forces acting upon it, as well as the Earth's rotation and the presence of other objects in space that may affect the satellite's path. This information is also shared with the satellite that enables the server system of the satellite to calculate (using its onboard systems) its current position and velocity, as well as the forces acting upon it, such as gravity and atmospheric drag. Notably, the trajectory of the satellite can be determined through mathematical models and simulations, and it is important for predicting the satellite's future position and ensuring that it remains in a stable orbit.

Typically, the first target location first establishes connection with the satellite and subsequently initiates communicating, such as sending and receiving data, such as images, videos, or scientific measurements, to and from the satellite's antenna. Notably, the amount of data that can be transmitted depends on the satellite's capabilities and the bandwidth of the RF link. Optionally, the first target location may be equipped with a specialized equipment to encrypt or decrypt the data, or to perform other processing tasks.

Optionally, the first communication beam is kept towards the first target location by adjusting an antenna radiation pattern direction of the satellite as function of the (moment along) trajectory. It will be appreciated that as the satellite orbits the earth, the antenna radiation pattern direction changes relative to the earth. Therefore, in order to maintain a robust communication between the satellite's antenna and the first target location, the satellite's antenna must be pointed towards the first target location, such that the first communication beam is kept towards the first target location, preferably towards a centre thereof. Optionally, the antenna radiation pattern direction may be adjusted by tilting or rotating the antenna to compensate for the changing position of the satellite as it moves through its orbit, as well as adjusting the frequency and signal strength of the communication beam to optimize the transmission and reception of data. The antenna radiation pattern direction can be controlled electronically by without mechanical changes to the antenna structure as such by adjusting frequencies and powers to antenna elements. In an embodiment, such adjustment might be automated by employing a machine learning/artificial intelligence tool. Alternatively, such adjustment is suggested by a user of the server system of the satellite. It will be appreciated that by using the information corresponding to the first target location on the surface of the earth and the trajectory of the satellite, the satellite's antenna radiation pattern direction is adjusted in real-time as a function of the trajectory, in order to maintain a stable connection with the first target location.

Furthermore, the method comprises identifying a first interference restrictive area, which the satellite trajectory passes. The term "interference restrictive area" is a defined area where the interference caused from the non-terrestrial network (NTN) radio transmissions is lower than the normal operational area of NTN. Having said that it will be appreciated that besides the NTN, the terrestrial networks (TN), such as cellular networks, may result in radio transmissions in and around the interference restrictive area. It will be appreciated that the satellite orbits do not always pass directly over the interference restrictive area, but they may pass from the side of the interference restrictive area. Herein, the term "first interference restrictive area" refers to one of many identified interference restrictive areas.

The interference restrictions can be due to different International Telecommunication Union Radiocommunication Sector (ITU-R) radio regulations in different regions, namely region 1 (Europe, Middle East and Africa (EMEA)), region 2 (Americas and Caribbean), and region 3 (Asia and Australasia). It will be appreciated that different countries have different laws and regulations, different timelines of a frequency band deployments, and other types of interference restrictions for various reasons, e.g., avoidance of interreference between different radio systems and prioritisation of the radio systems in question. It is important to identify interference restrictive areas, that fall on the trajectory of a satellite, to avoid any potential negative effects for existing terrestrial networks.

Optionally, the method enables storing, in a database, information corresponding to the identified interference restrictive area which is communicated to the server system of the satellite flying on the trajectory that passes the interference restrictive area. Beneficially, by identifying the interference restrictive areas, satellite operators can ensure that the satellite systems operate reliably and effectively, without receiving interference from other wireless systems or causing interference to the other wireless systems. Such uninterrupted satellite operations are important for critical satellite applications, such as those used for navigation, communication, and weather forecasting.

Furthermore, the method comprises determining an elevation angle in respect to the satellite and the first target location, wherein the elevation angle is an angle between a horizontal plane of the earth and a vector pointing from the first target location to the satellite along the trajectory at given moment of time. One way to define the elevation angle (EA) is that it corresponds to an angle formed between a (imaginary) line of sight (vector), resulting from a (radio communication) beam, that connects the satellite and the first target location, and a horizontal plane. The elevation angle is thus sharp angle between the horizontal plane and the vector. The elevation angle can have values between 0 to 90 degrees. 0 degrees refer to a situation in which the satellite is in a horizon. The elevation angle is 90 degrees when the satellite is in nadir. Nadir refers to the situation that the first target location is on the line between the centre of the earth and the satellite. Elevation angle values increase from 0 to maximum 90 when the satellite moves along the trajectory over the target location. As the satellite has gone over the target location the elevation angle will reduce from a maximum value 90 degrees towards 0 degrees as the satellite disappears to the horizon. It will be appreciated that the EA is formed from a centre of the first target location such that the satellite's antenna follows the centre of the first target location that is in view of the satellite, while the satellite orbits the earth in its trajectory. The maximum elevation angle reaches 90 degrees only when the orbit of the satellite goes over the first target location. When the orbit passes the first target location from side, the elevation angle has a maximum value which is lower than 90 degrees.

Elevation angle in respect to the target location depends also on deviation of the trajectory in respect to the target location. As an example, if the trajectory is large distance to left or right from the target location the elevation angle will be adjusted (as an example elevation angle could be 40 degrees if the trajectory goes directly over the target location, but could be 30 degrees if the trajectory goes 200 km to left of the target location) accordingly using standard geometry.

Furthermore, when moving towards the first interference restrictive area and when the first target location is in front of the first interference restrictive area, more active communication beams can be generated than when moving away from the first interference restrictive area.

Similarly, when moving towards the first interference restrictive area and when the first target location is behind the first interference restrictive area, less active communication beams can be generated than when moving away from the first interference restrictive area.

The method of the present disclosure enables creating non terrestrial network (NTN) coverage around the interference restrictive areas on the earth with different elevation angles for activation and deactivation angles for the beam centers of the first target location in front of the interference restrictive area and for the beam centers of the second target location after the interference restrictive area. Moreover, in the first interference restrictive area, the satellite beams are controlled so that the coverage in front of the first interference restrictive area is primarily created with satellites coming towards the first interference restriction area; and the coverage after the first interference restrictive area is primarily created with satellites which are after the first interference restrictive area.

In an embodiment, the NTN coverage is, for example, such that 80% of the time the NTN coverage in the front of the first interference restrictive area is provided by the satellites which are in front of the first interference restrictive area and 20% by the satellites which are above or after the first interference restrictive area. It will be appreciated that the percentage of NTN coverage may vary but according to the present invention the percentage is higher than 50% by the satellites in front of the first interference restrictive area. In another embodiment, the NTN coverage is, for example, such that 80% of the time the NTN coverage after the first interference restrictive area is provided by the satellites which are after the first interference restrictive area and 20% by the satellites which are above or in front of the first interference restrictive area. It will be appreciated that the percentage of NTN coverage may vary but according to the present invention the percentage is higher than 50% by the satellites after the first interference restrictive area.

Furthermore, the method comprises activating a first communication beam from the satellite towards the first target location when the elevation angle is between an activation angle and a deactivation angle, wherein the activation angle is less than the deactivation angle if the first interference restrictive area is located in a forward direction in respect to the satellite motion along the trajectory, and the deactivation angle is less than the activation angle if the first interference restrictive area is located in backward direction in respect to the satellite motion along the trajectory. Herein, "activating the first communication beam" refers to initiating or providing the first communication beam from the satellite's antenna towards the first target location.

As a practical example, let's consider a satellite which is moving along a trajectory. The satellite has capability of activating multiple directional communication beams. Typically, number of these beams can be 30, 50 or 100. Each beam is purposed to provide communication to and from respective target locations. On the ground, there can be certain interference restrictive areas to which the interference caused by a beam (or group of beams) from satellite must be eliminated. In practice, this can be done by activating and deactivating one communication beam, a set of communication beams or all of the communication beams. Activation and deactivation can refer to turning on or off a communication beam. It can also refer on directing already active beam towards to respective target location. Additionally activating and deactivating can refer to adjusting transmission power of a communication beam. According to one embodiment at least one of the communications beams is activated when the elevation angle bypasses the activation angle. According to an embodiment all of the communication beams are deactivated as the elevation angle bypasses the deactivation angle (i.e. when approaching the target location when the elevation angle (value) is larger than the deactivation angle and when the satellite is moving away from the target location the elevation angle (value) is smaller than the deactivation angle.

Satellite arises from horizon in respect to the first target location. An elevation angle in respect to satellite and the first target location is at that point of time 0 degrees. The satellite moves along the trajectory and eventually the elevation angle is a first target angle (i.e the activation angle), (as an example 20 degrees). The first communication beam from the satellite towards the first target location is activated since the elevation angle is larger than the first target (activation) angle (20 degrees). The satellite moves along the trajectory even further and thus the elevation angle gets increasing towards a second target (deactivation) angle (say 30* degrees after the target location). 30* degrees (after the target location) here now refers to situation that the satellite has gone over the first target location. At this moment of time the first communication beam is deactivated. I.e. the first communication beam is activated when the elevation angle is between the activation angle (20 degrees) and the deactivation angle (30* degrees (after the target location angle)). In this example a first interference restrictive area is located in forward direction in respect to the satellite motion along the trajectory thus the activation angle is less than the deactivation angle.

It should be appreciated that the satellite can form multiple communication beams such as a second, a third etc communication beam. Similar logic is applied to each of the communication beam. Each of the communication beam activation and deactivation might be controlled with their own activating and deactivating angles.

Alternatively, there can be one determining beam of communication which is used to activate each communication beam. In said scenario the first communication beam activation activates other beams also. This reduces complexity as only one control angle pair is needed per satellite.

Activation logic (of the first communication beam or any of the other communication beams) changes if the interference restrictive area is located in backward direction in respect to the satellite motion along the trajectory. As an example, the satellite has an elevation angle in respect to a first target location. Initially elevation angle is say 80* degrees (after the target location). Communication beams are inactive. The satellite moves along and elevation angle exceeds 60* degrees point (i.e. activation angle) i.e. for example to value of 59* degrees. The first communication beam is activated. The satellite moves further on the trajectory and the elevation angle changes as function of movement as discussed. Eventually the elevation angle is less than 40 degrees. At this angle (deactivation angle) the first communication beam is deactivated.

Synergistic technical effect of this is that one is able to control unwanted interference of satellite communication more precisely. Indeed, it has been surprising to find, that if the activation angle and deactivation angle are same for target locations irresectable, if the target location is before or after interference restrictive area, the satellites causes more interference in comparison for the disclosed method. The activation (first angle) and deactivation (second angle) angles in present disclosure depend on which direction, in relation to the movement of the satellite, the first interference restrictive area is to the target location. When this taken in account one is able to implement a satellite communication system which achieves a higher throughput without causing additional interference.

Herein, the term "communication beam" refers to a focused stream of electromagnetic radiation, such as radio waves or microwaves, that carries information through a communication link established by the satellite antenna with a target location on the earth. Herein, the term "first communication beam" refers to one of many communication beams sent from the satellite antenna toward the first target location. Once the first communication beam reaches the first target location, it would be received by the antenna associated with the first target location, which would decode the signal and process the information contained within it. It will be appreciated that field strength of the first communication beam on the earth is stronger on the satellite side of the first communication beam than on the side that is farther away from the satellite. Notably, a strong field strength is a desired characteristic for coverage, but an unwanted characteristic for interference. Optionally, the first communication beam is provided at an S-band radio frequency ranging from 1980 to 2010 MHz in uplink (UL) direction and from 2170 to 2200 MHz in downlink (DL) direction (Band n256). Optionally, the first communication beam is provided at an L-band radio frequency ranging from 1525 to 1559 MHz DL together with 1626.5 to 1660.5 MHz for the UL (Band n255).

Herein, the activation angle and the deactivation angle are formed by the first communication beam sent from a satellite towards a specific location on Earth. Moreover, the activation angle and the deactivation angle are minimum and maximum angles between which a communication beam between the first target location and the satellite can be formed without causing interference which exceeds regulations to the first interference restrictive area. As discussed, the activation and the deactivation angles depend on relative location of the target area in respect to the interference restrictive areas and the satellite movement orbiting the earth.

Optionally, the satellite is operable to activate a plurality of communication beams to respective plurality of target locations in addition to the first communication beam. It will be appreciated that the satellite may generate a plurality of communication beams, such as a second communication beam, a third communication beam, a fourth communication beam, and so on, via a plurality of antennas. Such plurality of communication beams may be targeted at a plurality of target locations, such as a second target location, a third target location, a fourth target location, and so on. It will be appreciated that each of the plurality of target locations may or may not receive the plurality of communication beams from the plurality of antennas. Alternatively, a target location from amongst the plurality of target locations is specific for a particular communication beam from amongst a plurality of communication beams. Moreover, the plurality of communication beams may be of same or different radio frequency (RF) link compared to the first communication beam.

It will be appreciated that if multiple satellites are transmitting a plurality of communication beams towards the same target location, such as the first target location, the signals can interfere with each other, causing degradation or disruption of the communication. In an example, if a satellite transmits a signal on the same area with the same frequency as a terrestrial 5G/6G network, then there will be an interference between the satellite and 5G/6G signals that may interfere or even block the radio transmission from both the satellite and 5G/6G network. Beneficially, the method of the present disclosure enables providing specific target locations around the interference restrictive areas, for a higher coverage and capacity with the communication beams that arrive from the side away from the interference restrictive area than with the communication beams that arrive from the side of the interference restrictive area.

The non-geostationary orbit satellite system activation and deactivation angles are a part of the satellite constellation design. When activation and deactivation angles are low, less satellites are needed in the constellation than when activation and deactivation angles are high. Low activation angles decrease the cost of satellite system. Low activation and deactivation angles have the following negative characteristics: they do not allow buildings or other obstacles around the target area user, they require a higher power level, they are less directional and cause interference to a larger area. Additionally, less satellites in the constellation means less total capacity in the satellite communication system.

Optionally, the activation angle is 20 to 40 degrees and the deactivation angle is 60 to 41* degrees when a first interference restrictive area is located in the forward direction in respect to the satellite motion along the trajectory. In such case, the activation angle may be from 20, 25, 30 or 35 degrees up to 25, 30, 35 or 40 degrees (as seen from direction approaching the target location), and the deactivation angle may be from 60, 65, 70, 75, 80, 85, 90, 85*, 75*, 65*, 55* or 45* degrees up to 65, 70, 75, 80, 85, 90, 85*, 75*, 65*, 55*, 45* or 41* degrees. More optionally, the activation angle is 25 degrees and the deactivation angle is 80 degrees when a first interference restrictive area is located in the forward direction in respect to the satellite motion along the trajectory. Yet more optionally, the activation angle is 30 degrees and the deactivation angle is 90 degrees when a first interference restrictive area is located in the forward direction in respect to the satellite motion along the trajectory. Notation * after angle refers to elevation angles in which the satellite is moving away from the target location i.e. the elevation angle value increases from 90 towards 0. Degrees in which no "*" notation is used, refer to those values in which the satellite is approaching the target location elevation angle values is increasing from 0 towards 90.

Optionally, the activation angle is 41 to 60* degrees and the deactivation angle is 40* to 20* degrees when the first interference restrictive area is located in the backward direction in respect to the satellite motion along the trajectory. In such case, the activation angle may be from 41, 45, 50, 55, 60, 65, 70, 75, 80, 85, 90, 85*, 80*, 75*, 70*, 65* up to 45, 50, 55, 60, 65, 70, 75, 80, 85, 90, 85*, 80*, 75*, 70*, 65* or 60* degrees. The deactivation angle may be from 40*, 35*, 30*, 25* up to 35*, 30*, 25*, 20* degrees. More optionally, the activation angle is 90 degrees and the deactivation angle is 30* degrees when a first interference restrictive area is located in the backward direction in respect to the satellite motion along the trajectory. Yet more optionally, the activation angle is 25 degrees and the deactivation angle is 85* degrees when a first interference restrictive area is located in the backward direction in respect to the satellite motion along the trajectory. Notation * after angle refers to elevation angles in which the satellite is moving away from the target location i.e. the elevation angle increases from 90 towards 0. Degrees in which no "*" notation is used, refer to those values in which the satellite is approaching the target location i.e. elevation angle increasing from 0 towards 90. One way to compare number values of said notations is to calculate reference value Ref=180−x* and then compare values without notation * with ref values, when the trajectory passes directly over the target location.

Optionally, the deactivation angle is a function of interference caused by the plurality of communication beams to the first target location, wherein the deactivation angle decreases as the interference increases. Optionally, the activation angle is a function of interference caused by the plurality of communication beams to the first target location, wherein the activation angle increases as the interference increases. As the plurality of communication beams are activated towards the first target location, the interference at the first target location increases, that affects the angle at which the signal is received at the first target location. In this regard, different phases and amplitudes of the plurality of communication beams may be combined (or reinforced) or destructed at the receiving first target location. As the interference of the plurality of beams increases the inclination of the beams as the satellite moves along the trajectory increases, thereby increasing the activation angle while decreasing the deactivation angle of the first communication beam.

Optionally, the first communication beam towards the first target location is deactivated when the elevation angle is larger than the deactivation angle. After deactivation the first communication beam is redirected towards a second target location after the deactivation. Herein, the term "deactivated/deactivation" is related to a discontinuation of the first communication beam. Therefore, as the elevation angle exceeds the deactivation angle, the first communication beam is focused on the second target location that is in the field of view of the satellite orbiting the earth. It will be appreciated that it is important that the target locations are changed for the first communication beams to prevent causing interference in the first interference restrictive area as the satellite passes the first interference restrictive area. Especially, when the interference restrictive area is large, the first communication beam may be deactivated for a period, so that it does not cause harmful interference to the first interference restrictive area or to the second restrictive area, before it is activated again after redirecting the beam.

Optionally, the first communication beam is redirected towards a second target location after the deactivation and the redirected first communication beam is activated towards the second target location when the elevation angle is between a new activation angle and a new deactivation angle, wherein the new activation angle is less than the new deactivation angle if a second interference restrictive area is located in a forward direction in respect to the satellite motion along the trajectory; and the new activation angle is more than the new deactivation angle if the second interference restrictive area is located in backward direction in respect to the satellite motion along the trajectory. As the first communication beam is redirected and activated towards a new target location, namely the second target location, the EA of the first communication beam at the second target location is between the new first and deactivation angles, similar to the EA of the first communication beam at the first target location. Herein, the second target location is location after the first interference restrictive area.

The present disclosure also relates to the system and to the computer program product as described above. Various embodiments and variants disclosed above, with respect to the aforementioned method, apply mutatis mutandis to the system and to the computer program product.

Optionally, the server system comprises at least one server. Notably, the at least one server controls an overall operation of the system. In some implementations, the at least one server is implemented as a remote server. In such implementations, the remote server receives the plurality of communication beams directed at fixed target locations (namely, earth fixed beams) to restrict interference (at defined interference restrictive areas) resulting from multiple communication beams. In an example, the remote server could be a cloud server that provides a cloud computing service. In other implementations, the at least one server is implemented as a processor of a computing device. It will be appreciated that the server is ""a single serve"" in some implementations, and ""a plurality of server"" in other implementations. When the system comprises the single server, all operations of the system can be performed by the single server. When the system comprises the plurality of servers, different operations of the system can be performed by different (and specially configured) servers from amongst the plurality of servers. As an example, a first server from amongst the plurality of servers may be configured to identify a first interference restrictive area, from amongst the database of restrictive areas, which the satellite trajectory passes, and a second server from amongst the plurality of servers may be configured to activate the first communication beam from the satellite towards the first target location based on a determined elevation angle of the first communication beam.

It will also be appreciated that the database could be implemented, for example, such as a memory of the server system, a memory of the computing device, a removable memory, a cloud-based database, or similar. Moreover, the records of the restrictive areas in the database enables the satellite to use said information and change the antenna radiation pattern direction as it passes through these areas.

The server system is configured to communicate values of the activation angle and the deactivation angle to the satellite via a communication network between the first target location and the satellite. The communication network includes a medium (e.g., a communication channel) through which the satellite and the first target location communicate with each other. The communication network may be a wired or wireless communication network. Examples of the communication means/network may include, but are not limited to, Internet, a Local Area Network (LAN), a wireless personal area network (WPAN), a Wireless Local Area Network (WLAN), a wireless wide area network (WWAN), a cloud network, a Long-Term Evolution (LTE) network, a plain old telephone service (POTS), a Metropolitan Area Network (MAN), and/or the Internet.

Optionally, the satellite comprises an antenna for providing a first communication beam from the satellite.

Optionally, the first communication beam is kept towards the first target location by adjusting an antenna radiation pattern direction as function of the trajectory.

Optionally, the satellite is operable to activate a plurality of communication beams to respective plurality of target locations in addition to the first communication beam.

Optionally, the activation angle is 20 to 40 degrees and the deactivation angle is 60 to 41* degrees when a first interference restrictive area is located in the forward direction in respect to the satellite motion along the trajectory.

Optionally, the activation angle is 41 to 60* degrees and the deactivation angle is 40* to 20* degrees when the first interference restrictive area is located in the backward direction in respect to the satellite motion along the trajectory.

Optionally, the deactivation angle is a function of interference caused by the plurality of communication beams to the first target location, wherein the angle difference between the activation angle and deactivation angle decreases as the interference increases.

Optionally, the activation angle is a function of interference caused by the plurality of communication beams to the first target location, wherein the angle difference between the activation angle and deactivation angle decreases as the interference increases.

Optionally, the first communication beam towards the first target location is deactivated when the elevation angle is larger than the deactivation angle, and the first communication beam is redirected towards a second target location after the deactivation.

Optionally, the first communication beam is redirected towards a second target location after the deactivation and the redirected first communication beam is activated towards the second target location when the elevation angle is between a new activation angle and a new deactivation angle, wherein the new activation angle is less than the new deactivation angle if a second interference restrictive area is located in a forward direction in respect to the satellite motion along the trajectory; and the new deactivation angle is less than the new activation angle if the second interference restrictive area is located in backward direction in respect to the satellite motion along the trajectory.

As a further example of logic of forming communication beam controlling signals

TABLE 1

Interference restrictive area is located in forward direction in respect to the satellite motion target area and the first target location is before the interference restrictive area in respect to the satellite motion (EA = elevation angle, d1 = activation angle, d2 = deactivation angle))

|  | Beam 1 | Beam 2 | Beam 3 |
|---|---|---|---|
| EA < d1 | Not active | Not active | Not active |
| d1 < d3 < EA < d2 | Active | Not active | Active |
| EA > d2 | Not active | Not active | Not active |

Table 1 gives example of a satellite comprising three beams (beam 1, 2, and 3). in this example all beams are non-active if EA is less than activation angle d1 and all beams are non-active if EA is more than deactivation angle d2. Beam 2 is non-active when EA is larger than d3 which is deactivation (deactivation angle) for the said beam 2. Rest of the beams are still active. When the angle is above d2 then all beams are not active.

TABLE 2

Interference restrictive area before beam center(s).

|  | Beam 1 | Beam 2 | Beam 3 |
|---|---|---|---|
| EA < d1 | Not active | Not active | Not active |
| d1 < EA < d4 | Active | Active | Not active |
| d4 < EA < d2 | Active | Active | Active |
| EA > d2 | Not active | Not active | Not active |

In table 2 is example of a case in which beam 1 and beam 2 are activated at activation angle of d1. The beam 3 has individual activation angle of d4>d1. When angle is between d1 and d4 only beam 3 is non-active. When angle is between d4 and d2 all are active and when the angle is more than d2 all are not active.

DETAILED DESCRIPTION OF THE DRAWINGS

Referring to FIG. 1, illustrated is a flowchart depicting steps of a method for controlling a satellite communication of a satellite flying on a trajectory over the earth, in accordance with an embodiment of the present disclosure. At step 102, a first target location is provided on the surface of the earth. At step 104, the trajectory of the satellite over the earth is determined. At step 106, a first interference restrictive area is identified, which the satellite trajectory passes. At step 108, an elevation angle, in respect to the satellite and the first target location, is determined, wherein the elevation angle is an angle between a horizontal plane of the earth and a vector pointing from the first target location to the satellite along the trajectory at given moment of time. At step 110, a first communication beam is activated from the satellite towards the first target location when the elevation angle is between a activation angle and a deactivation angle, wherein the activation angle is less than the deactivation angle if the first interference restrictive area is located in a forward direction in respect to the satellite motion along the trajectory, and the activation angle is more than the deactivation angle if the first interference restrictive area is located in backward direction in respect to the satellite motion along the trajectory.

The steps 102, 104, 106, 108 and 110 are only illustrative and other alternatives can also be provided where one or more steps are added, one or more steps are removed, or one or more steps are provided in a different sequence without departing from the scope of the claims herein.

Figure 2A:
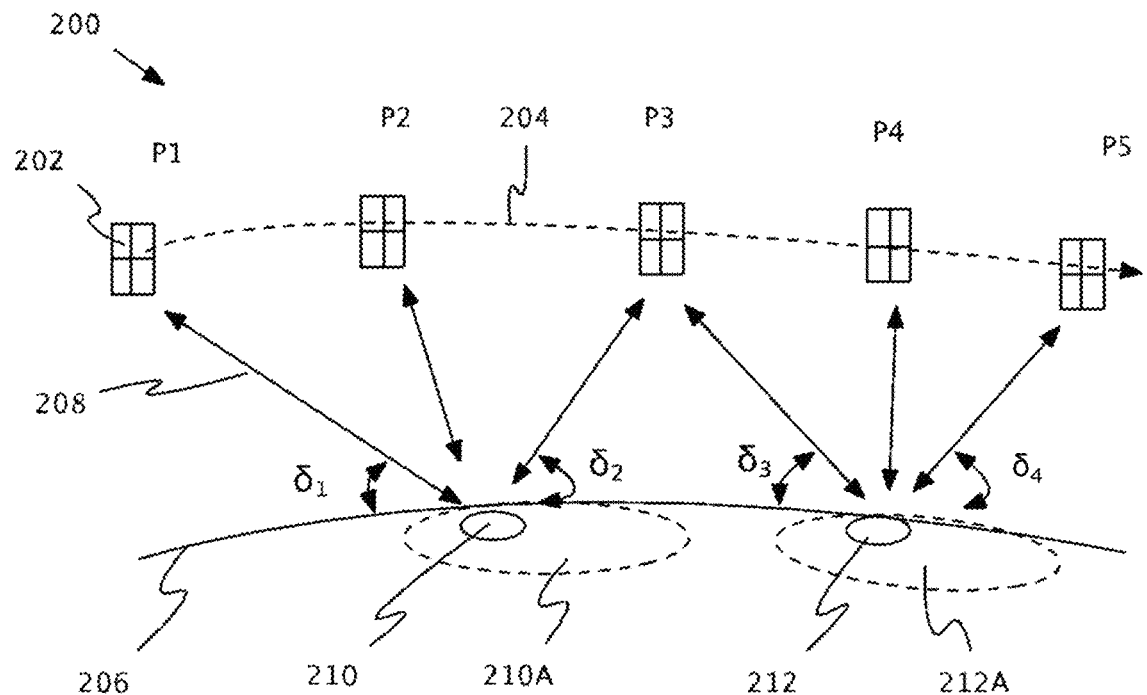
FIG. 2A illustrates a block diagram of an architecture of a system for controlling a satellite communication of a satellite flying on a trajectory over the earth, in accordance with an embodiment of the present disclosure.
Figure 2B:
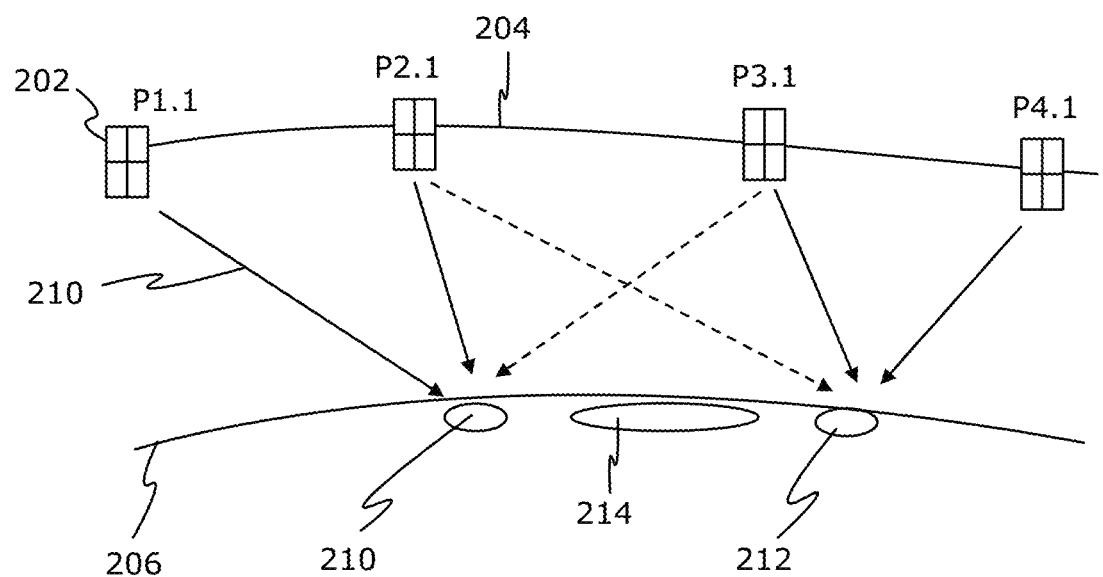
FIG. 2B illustrates a block diagram of an architecture of a system comprising multiple satellites for controlling satellite communication of multiple satellites flying on a trajectory over the earth, in accordance with an embodiment of the present disclosure.

Referring to FIGS. 2A and 2B, illustrated are block diagrams of an architecture of a system 200 for controlling a satellite communication of a satellite 202 flying on a trajectory 204 over the earth 206, in accordance with an embodiment of the present disclosure. The system 200 comprises a server system configured to perform the operations of the system. As shown in FIGS. 2A and 2B, a satellite 202 is flying on a trajectory 204 over the earth 206. While flying on a trajectory 204 the satellite 202 takes up different positions, namely, P1, P2, P3, P4 and P5, wherefrom the satellite 202 activates a first communication beam 208 towards a first target location 210 and a second target location 212. The server system is configured to locate the first target location 210 and the second target location 212 on the surface of the earth 206; determine the trajectory 204 of the satellite 202 over the earth 206; identify, from a database of the restrictive areas, a first interference restrictive area 214 as shown in FIG. 2B, which the satellite trajectory 204 passes. The system comprises a server system configured to determine the trajectory 204 of the satellite 202 over the earth 206. Moreover, the server system is configured to determine an elevation angle (such as δ1, δ2, δ3, δ3) in respect to the satellite 202 and the first target location 210 or the second target location 212, wherein the elevation angle is an angle between a horizontal plane of the earth 206 and a vector pointing from the first target location 210 or the second target location 212 to the satellite 202 along the trajectory 204 at given moment of time. Furthermore, the server system is configured to activate the first communication beam 208 from the satellite 202 towards the first target location 210 or the second target location 212 when the elevation angle is between a activation angle δ1,δ3 and a deactivation angle δ2, δ4, wherein the activation angle δ1,δ3 is less than the deactivation angle δ2, δ4 if the first interference restrictive area 214 is located in a forward direction in respect to the satellite 202 motion along the trajectory 204. and the activation angle δ1 is more than the deactivation angle δ2 if the first interference restrictive area 214 is located in backward direction in respect to the satellite 202 motion along the trajectory 204. Furthermore, the server system is configured to communicate values of the activation angle δ1 and the deactivation angle δ1 to the satellite 202.

As shown, the activation angle $\delta_1$ is less than the deactivation angle $\delta_2$ if the first interference restrictive area 214 is located in a forward direction in respect to the satellite 202 motion along the trajectory 204. The deactivation angle δ4 is less than the activation angle δ1, if the first interference restrictive area 214 is located in backward direction in respect to the satellite 202 motion along the trajectory 204. Herein, the angle is 0 degrees when the satellite 202 arises from the horizon. The elevation angle increases to 90 degrees with the satellite 202 is exactly on top of the first target location (at nadir) 210 and the elevation angle decreases from 90* degrees as the satellite 202 moves along the trajectory 204 towards 0*. Notation * indicating that target location is behind the trajectory.

The first communication beam 208 from the satellite 202 is activated and directed towards the first target location 210 when the satellite 202 is between positions P1 and P3, when the elevation angle is between the activation angle δ1 and the deactivation angle 82. The first communication beam 208 from the satellite 202 is activated and directed towards the second target location 212 when the satellite 202 is between positions P3 and P5, when the elevation angle is between the activation angle 83 and the deactivation angle (not shown).

As shown, the first communication beam 208 causes interference and noise to surrounding areas 210A and 212A around the first target area 210 and the second target area 212A, respectively. When the satellite 202 moves at position P3 the direction of the first communication beam 208 changes from the first target location 210 to a second target location 212. This way the satellite 202 is able to provide communication when going around the earth 206.

As shown in FIG. 2B, the first communication beam 208 from the satellite 202 is deactivated and not directed towards the first target location 210 when the satellite 202 is at position P3.1, and similarly, the first communication beam 208 from the satellite 202 is deactivated and not directed towards the first target location 212 when the satellite 202 is at position P2.1, as the first target location 210 and the first target location 212 are not in the view of the satellite 202 at said positions, respectively.

It may be understood by a person skilled in the art that the FIG. 2 includes a simplified architecture of the system 200 for sake of clarity, which should not unduly limit the scope of the claims herein. It is to be understood that the specific implementation of the system 200 is provided as an example and is not to be construed as limiting it to specific numbers or types of server systems, satellites, and target locations. The person skilled in the art will recognize many variations, alternatives, and modifications of embodiments of the present disclosure.

Figure 3A:
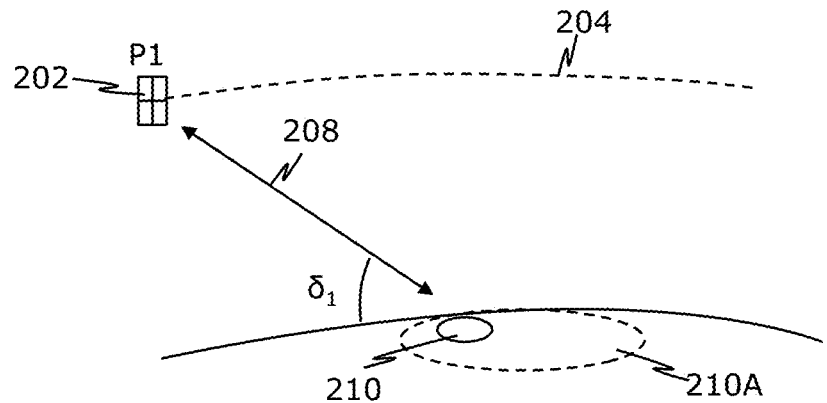
FIGS. 3A-C illustrate an exemplary motion of a satellite and how a surrounding area changes its formfactor as the satellite moves, in accordance with an embodiment of the present disclosure.
Figure 3B:
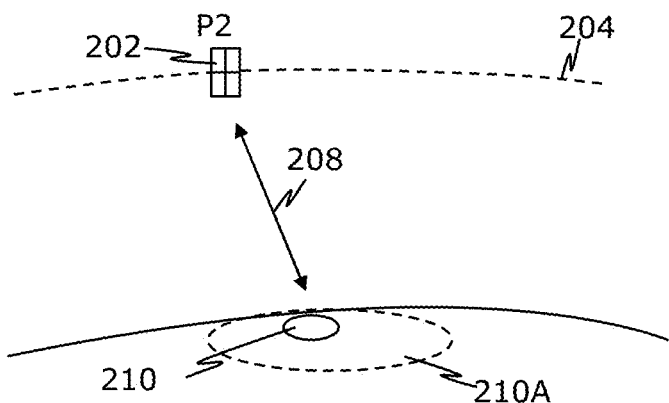
Figure 3C:
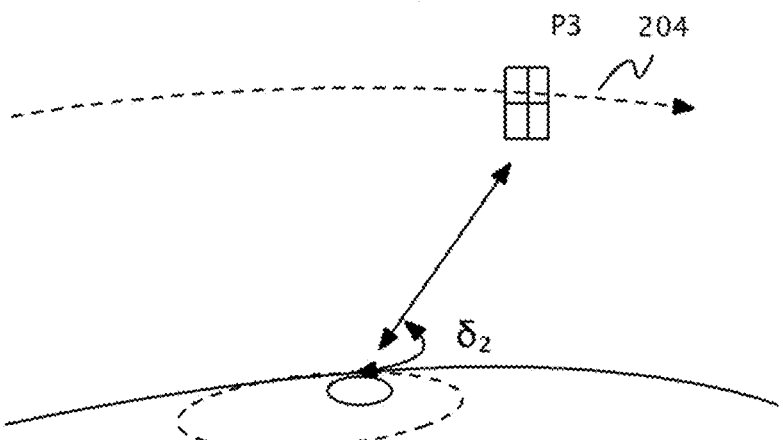

Referring to FIGS. 3A-C, illustrated is an exemplary motion of a satellite 202 and how a surrounding area changes its formfactor as the satellite 202 moves, in accordance with an embodiment of the present disclosure. As shown in FIG. 3A, the satellite 202 is at position P1 and a first target location 210 receives a first communication beam 208 from the satellite 202. The satellite 202 and the first target location 210 makes an elevation angle δ1. Also shown at this position, is a surrounding area 210A around the first target location 210 that receives interference more on a right side thereof. As shown in FIG. 3B, the satellite 202 moves from the position P1 to a position P2, and at this position, the surrounding area 210A around the first target location 210 that receives interference equally on the right and left side thereof. As shown in FIG. 3C, the satellite 202 moves to the position P3. When the satellite 202 moves from the position P1 to P3 the elevation angle changes from δ1 to δ2 between the satellite 202 and the first target location 210. Moreover, at this position, the surrounding area 210A around the first target location 210 receives interference more on the left side thereof. When in operation the first communication beam 208 is active when the elevation angle is between δ1 and δ2. It is non active outside of the range.

Figure 4A:
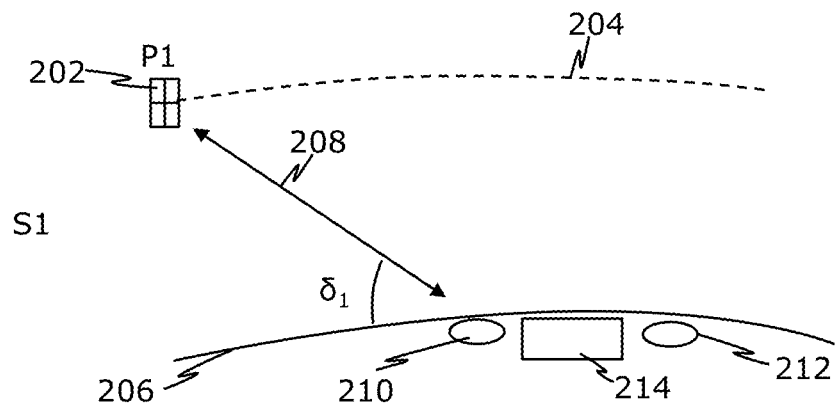
FIGS. 4A-E illustrate step-by-step motion of a satellite flying on a trajectory over the earth, in accordance with an embodiment of the present disclosure.
Figure 4B:
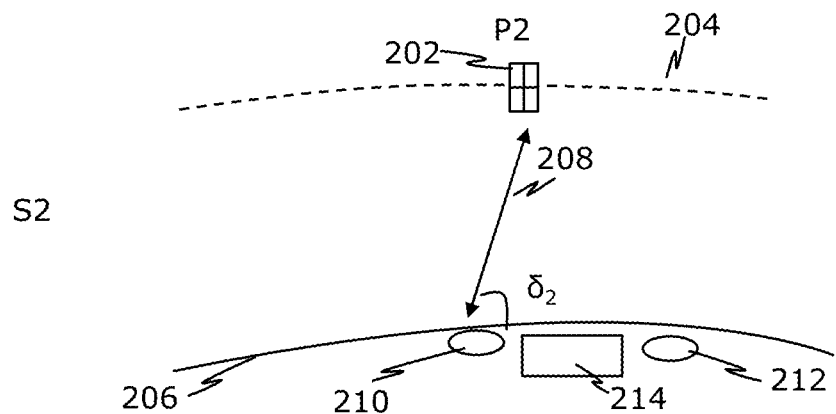
Figure 4C:
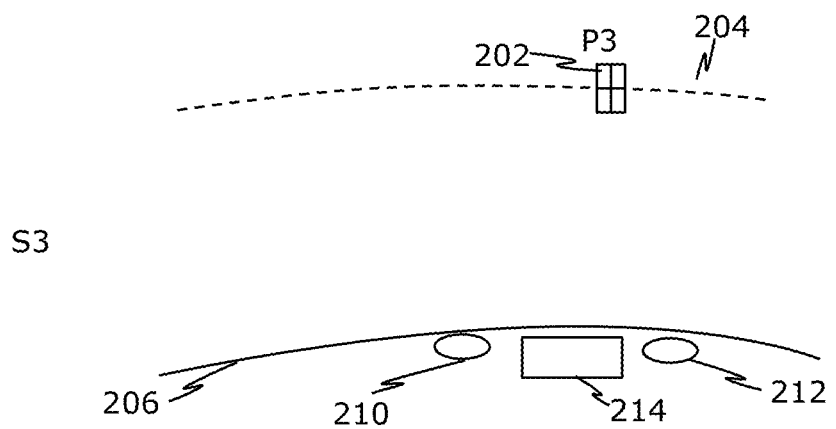
Figure 4D:
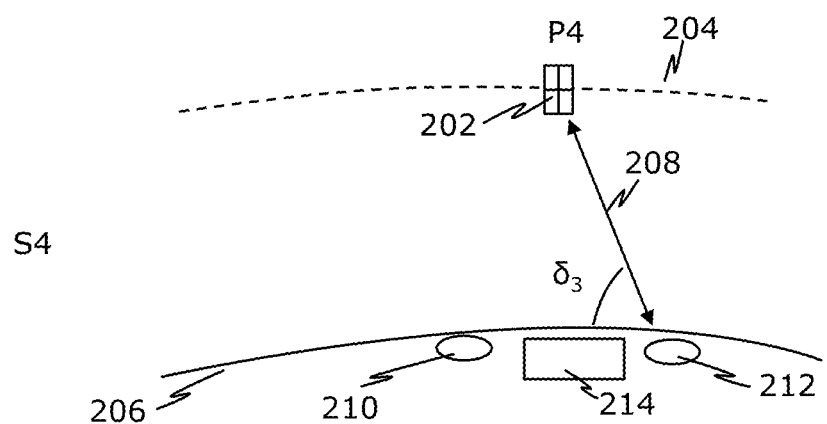
Figure 4E:
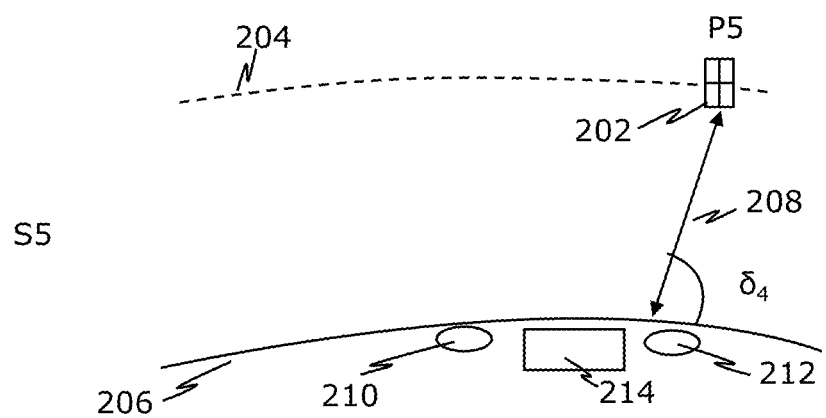

Referring to FIGS. 4A-E, illustrated is a step-by-step motion of a satellite 202 flying on a trajectory 204 over the earth 206, in accordance with an embodiment of the present disclosure. As shown in FIGS. 4A and 4B, through steps S1 and S2, the satellite 202 moves along a trajectory 204 from a position P1 to P2. A first beam of communication 208 directed towards a first target location 210 changes its elevation angle from a activation angle δ1 to a deactivation angle δ2 from a position P1 to P2. The first communication beam 208 is activated when the elevation angle is more than the activation angle δ1. The first communication beam 208 is kept active until point P2 in which the elevation angle is a deactivation angle δ2. As shown in FIG. 4C, at step S3, the first communication beam 208 is deactivated at position P3, when elevation angle is same or more than deactivation angle δ2, i.e., when the satellite 202 trajectory 204 passes the first interference restrictive area 214. As shown in FIGS. 4D and 4E, through steps S4 and S5, the satellite 202 moves along a trajectory 204 from a position P4 to P5. The first beam of communication 208 directed towards a second target location 210 changes its elevation angle from a activation angle δ3 to a deactivation angle 84 from a position P4 to P5. Herein, a activation angle δ3 is higher a deactivation angle 84 as the first interference restrictive area 214 is located in backward direction to the satellite 202 motion.

Figure 5A:
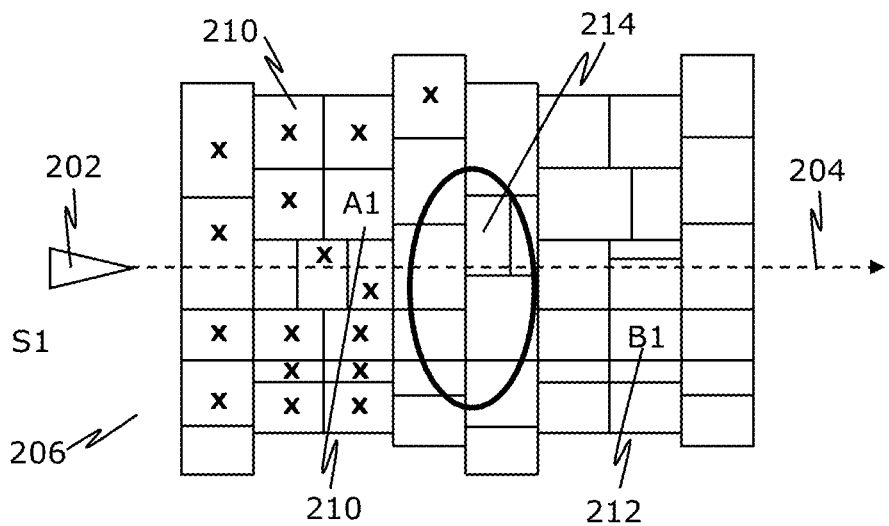
FIG. 5A-C illustrate step-by-step motion of a satellite flying on a trajectory over the earth, in accordance with an embodiment of the present disclosure.
Figure 5B:
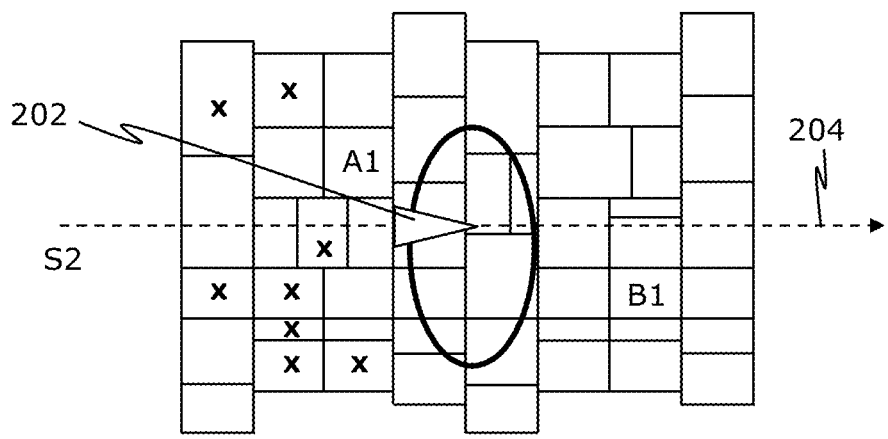
Figure 5C:
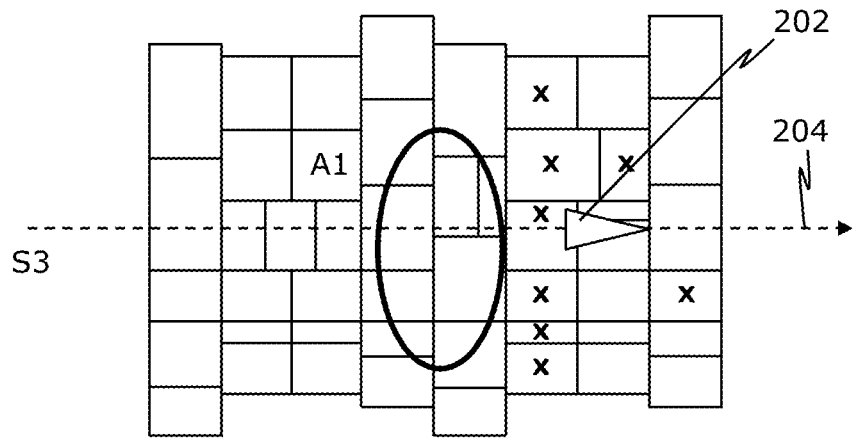

Referring to FIGS. 5A-C, illustrated is a step-by-step motion of a satellite 202 flying on a trajectory 204 over the earth 206, in accordance with an embodiment of the present disclosure. As shown, the satellite 202 activates a plurality of communication beams towards respective target locations 210 (marked with "x"). The first communication beam is directed towards target location 210 (marked with "A1"). Herein, the first interference restrictive area 214 is marked with an ellipse. It is not allowed to generate radio noise exceeding regulated level from any of the target areas to the first interference restrictive area 214. As shown, a second target location 212 (marked with "B1") is arranged on the other side of the first interference restrictive area 214.

As shown in FIG. 5A, the plurality of communication beams are active as the satellite 202 approaches the first interference restrictive area 214. As shown in FIG. 5B, the satellite 202 is on top of the first interference restrictive area 214 and as shown, some of the plurality of communication beams location areas are still active. As shown in FIG. 5C, the satellite 202 has redirected the first communication beam 208 from the first target location A1 to the second target location B1 and some of the plurality of communication beams are active at this step. We can see that the satellite 202 is able to maintain good communication coverage using the provided communication beam control logic.

Figure 6:
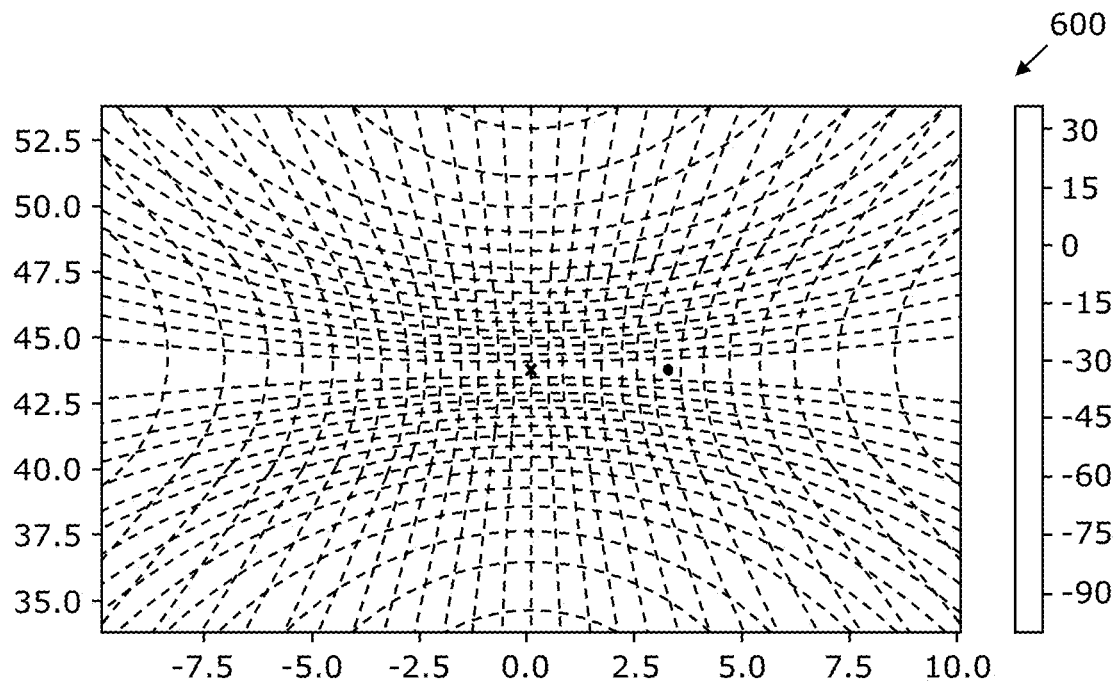
FIG. 6 illustrates a radiation pattern of a satellite communication beam on the earth, in accordance with an embodiment of the present disclosure.

Referring to FIG. 6, illustrated is a radiation pattern 600 of a satellite communication beam on the earth, in accordance with an embodiment of the present disclosure. As shown, the satellite beam on earth is a radiation pattern (depicted with the dashed line), which depends on the antenna in the satellite. As shown, the vertical scale depicts the latitude degrees and the horizontal scale depicts the longitude degrees and antenna gain in decibels is depicted by the hatch patterns. Herein, the satellite location is depicted by a cross and the satellite beam centre is depicted by a circle.

Figure 7:
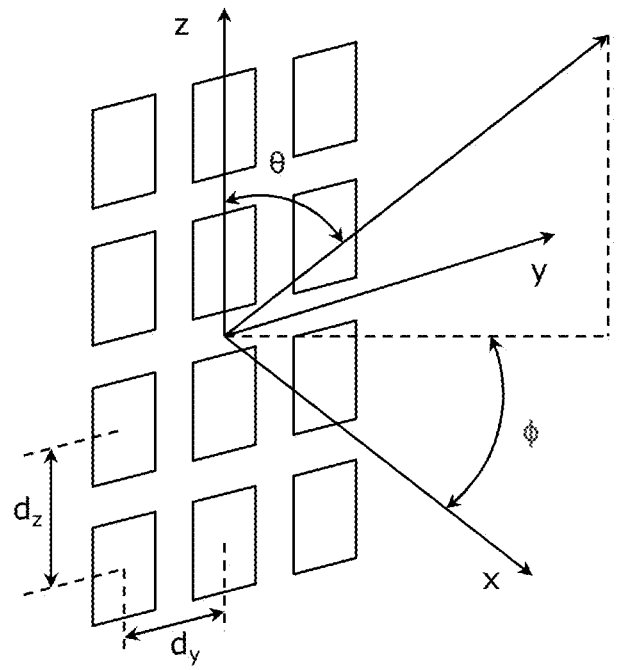
FIG. 7 illustrates an antenna model geometry, in accordance with an embodiment of the present disclosure.

Referring to FIG. 7, illustrated is an antenna model geometry 700, in accordance with an embodiment of the present disclosure. As shown, a plurality of antenna centres of which are separated by a distance d, are configured to direct the communication beam towards a given target location.

Figure 8A:
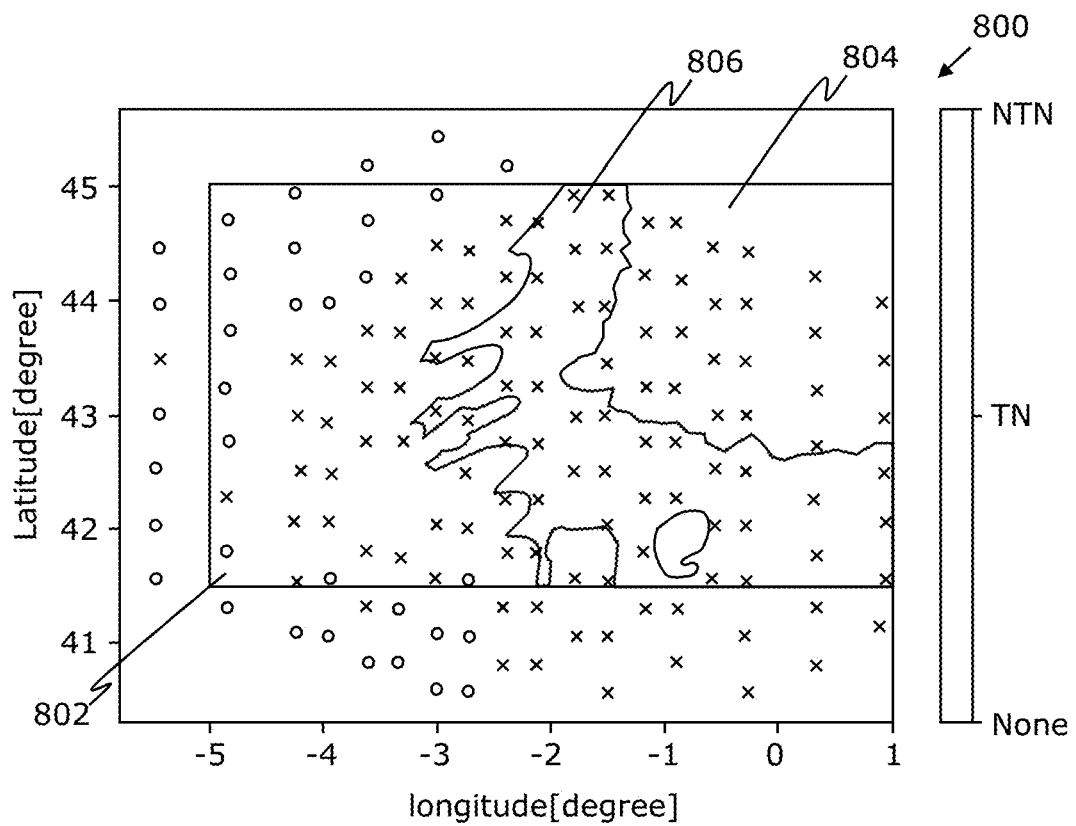
FIGS. 8A and 8B illustrate a sharing scenario of satellite communication between a non-terrestrial network (NTN) and a terrestrial network (TN) user equipment, in accordance with an embodiment of the present disclosure.
Figure 8B:
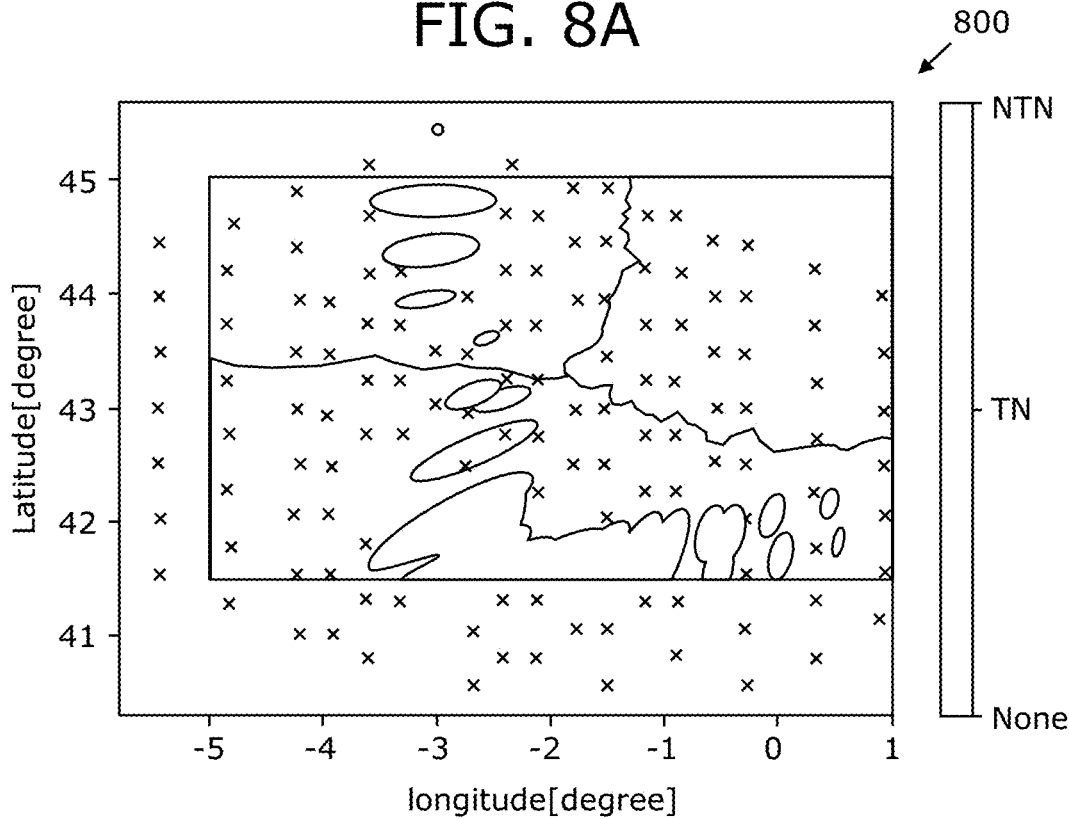

Referring to FIGS. 8A and 8B, illustrated is a sharing scenario 800 of satellite communication between a non-terrestrial network (NTN) 802 and a terrestrial network (TN) 804 user equipment, in accordance with an embodiment of the present disclosure. As shown, the area (map) is covered with plurality of satellite beams. FIG. 8A shows satellite at location in left bottom corner of the map and FIG. 8B shows the satellite at location of right upper corner of the map. Satellite movement is from left bottom to right top corner of the figure. The system optimizes the beams so that the aggregate interference from the beams does not exceed the set limit (here Interference to Noise ratio in TN User Equipment (UE) receivers<0 dB). The active beams are marked with circles and inactive beams with crosses.

Figure 9:
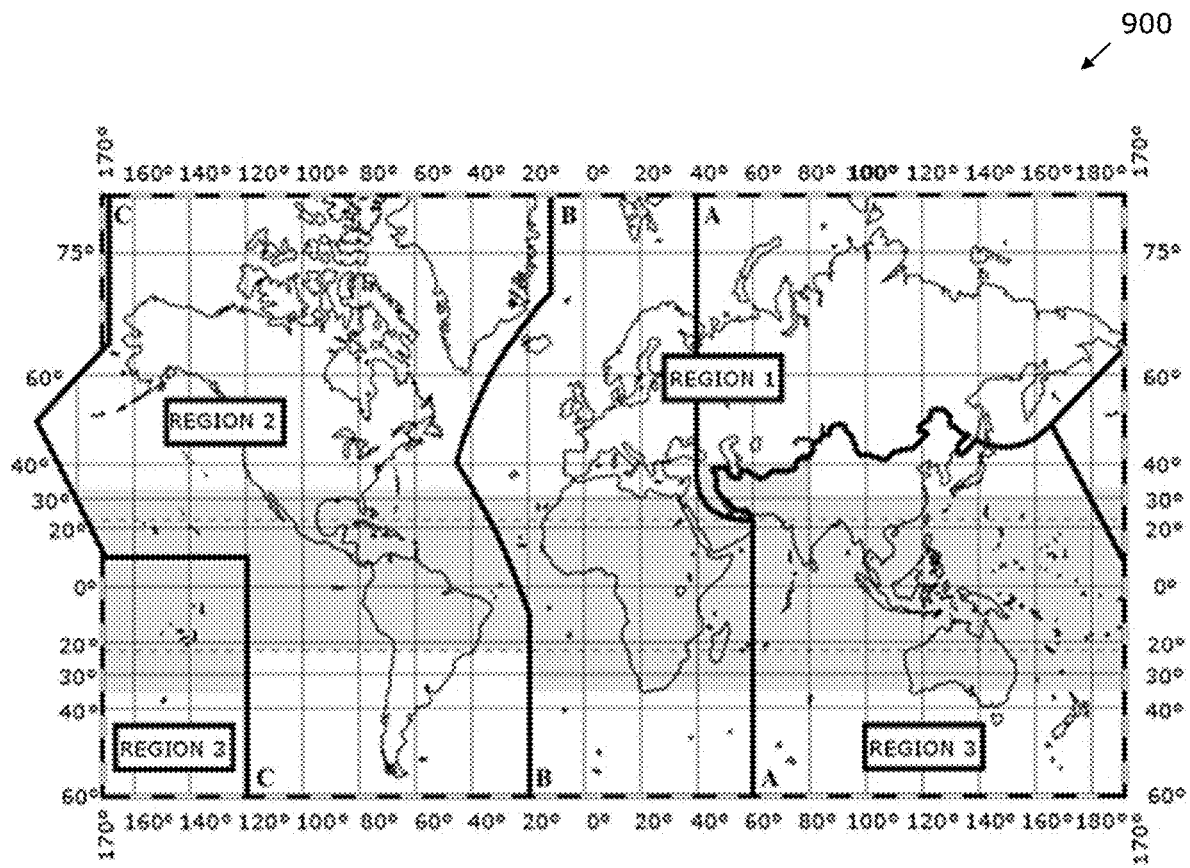
FIG. 9 illustrates a world map with regions for a part of S-band ITU-R frequency allocation, in accordance with an embodiment of the present disclosure.

Referring to FIG. 9, illustrated is a world map 900 with regions for a part of S-band ITU-R frequency allocation, in accordance with an embodiment of the present disclosure. As shown, International Telecommunication Union Radiocommunication Sector (ITU-R) radio regulations have classified the world in different regions, namely region 1 (Europe, Middle East and Africa (EMEA)), region 2 (Americas and Caribbean), and region 3 (Asia and Australasia).

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for controlling a satellite communication of a satellite flying on a trajectory over the earth, the method comprising providing a first target location on the surface of the earth;
determining the trajectory of the satellite over the earth;
identifying a first interference restrictive area, which the satellite trajectory passes;
determining an elevation angle in respect to the satellite and the first target location, wherein the elevation angle is an angle between a horizontal plane of the earth and a vector pointing from the first target location to the satellite along the trajectory at given moment of time; and
activating a first communication beam from the satellite towards the first target location when the elevation angle is between an activation angle and a deactivation angle, wherein
the activation angle is less than the deactivation angle if the first interference restrictive area is located in a forward direction in respect to the satellite motion along the trajectory, and
the deactivation angle is less than activation angle if the first interference restrictive area is located in backward direction in respect to the satellite motion along the trajectory and;
deactivating the first communication beam when the elevation angle is beyond the deactivation angle.

2. The method according to claim 1, wherein the first communication beam is kept towards the first target location by adjusting an antenna radiation pattern direction as function of the trajectory.

3. The method according to claim 1, wherein the satellite is configured to activate a plurality of communication beams to respective plurality of target locations in addition to the first communication beam and wherein all of the first communications beam and the plurality of communication beams are deactivated when the elevation angle is beyond the deactivation angle.

4. The method according to claim 1, wherein the activation angle is 20 to 40 degrees and the deactivation angle is 60 to 41* degrees when the first interference restrictive area is located in the forward direction in respect to the satellite motion along the trajectory.

5. The method according to claim 1, wherein the activation angle is 41 to 60* degrees and the deactivation angle is 40* to 20* degrees when the first interference restrictive area is located in the backward direction in respect to the satellite motion along the trajectory.

6. The method according to claim 3, wherein the deactivation angle is a function of interference caused by the plurality of communication beams to the first target location, wherein the angle difference between the activation angle and deactivation angle decreases as the interference increases.

7. The method according to claim 3, wherein the activation angle is a function of interference caused by the plurality of communication beams to the first target location, wherein the angle difference between the activation angle and deactivation angle decreases as the interference increases.

8. The method according to claim 1, wherein the first communication beam towards the first target location is deactivated when the elevation angle is larger than the deactivation angle, and the first communication beam is redirected towards a second target location after the deactivation.

9. The method according to claim 8, wherein the first communication beam is redirected towards a second target location after the deactivation and the redirected first communication beam is activated towards the second target location when the elevation angle is between a new activation angle and a new deactivation angle, wherein
the new activation angle is less than the new deactivation angle if a second interference restrictive area is located in a forward direction in respect to the satellite motion along the trajectory; and
the new deactivation angle is less than the new activation angle if the second interference restrictive area is located in backward direction in respect to the satellite motion along the trajectory.

10. A system for controlling satellite communication flying on a trajectory over the earth, the system comprising a server system configured to;
locate a first target location (210, 214) on the surface of the earth;
determine the trajectory of the satellite over the earth;
identify, from a database of restrictive areas, a first interference restrictive area, which the satellite trajectory passes;
determine an elevation angle in respect to the satellite and the first target location, wherein the elevation angle is an angle between a horizontal plane of the earth and a vector pointing from the first target location to the satellite along the trajectory at given moment of time; and
activate the first communication beam from the satellite towards the first target location when the elevation angle is between a activation angle and a deactivation angle, wherein
the activation angle is less than the deactivation angle if the first interference restrictive area is located in a forward direction in respect to the satellite motion along the trajectory, and
the deactivation angle is less than the activation angle if the first interference restrictive area is located in backward direction in respect to the satellite motion along the trajectory; and
communicate values of the activation angle and the deactivation angle to the satellite.

11. The system according to claim 10, wherein the satellite comprises an antenna for providing a first communication beam from the satellite.

12. The system according to claim 10, wherein the first communication beam is kept towards the first target location by adjusting the antenna radiation pattern direction as function of the trajectory.

13. The system according to claim 10, wherein the satellite is configured to activate a plurality of communication beams to respective plurality of target locations in addition to the first communication beam and wherein each of the first communication beam and the plurality of communication beams are deactivated when the elevation angle is beyond the deactivation angle.

14. The system according to claim 10, wherein the activation angle is 20 to 40 degrees and the deactivation angle is 60 to 41* degrees when a first interference restrictive area is located in the forward direction in respect to the satellite motion along the trajectory.

15. The system according claim 10, wherein the activation angle is 41 to 60* degrees and the deactivation angle is 40* to 20* degrees when the first interference restrictive area is located in the backward direction in respect to the satellite motion along the trajectory.

16. The system according to claim 13, wherein the deactivation angle is a function of interference caused by the plurality of communication beams to the first target location, wherein the angle difference between the activation angle and deactivation angle decreases as the interference increases.

17. The system according to claim 13, wherein the activation angle is a function of interference caused by the plurality of communication beams to the first target location, wherein the angle difference between the activation angle and deactivation angle decreases as the interference increases.

18. The system according to claim 10, wherein the first communication beam towards the first target location is deactivated when the elevation angle is larger than the deactivation angle, and the first communication beam is redirected towards a second target location after the deactivation.

19. The system according to claim 18, wherein the first communication beam is redirected towards a second target location after the deactivation and the redirected first communication beam is activated towards the second target location when the elevation angle is between a new activation angle and a new deactivation angle, wherein
the new activation angle is less than the new deactivation angle if a second interference restrictive area is located in a forward direction in respect to the satellite motion along the trajectory; and
the new deactivation angle is less than the new activation angle if the second interference restrictive area is located in backward direction in respect to the satellite motion along the trajectory.

20. A computer program product comprising a non-transitory machine-readable data storage medium having stored thereon program instructions that, when executed by a processor, cause the processor to execute steps of a method of claim 10.

* * * * *